2,766,175

MERSALYL DIURETIC SOLUTIONS STABILIZED WITH METHYLATED GLYCINES

Carl J. Klemme, Seymour, Ind., assignor to The Central Pharmacal Company, Seymour, Ind., a corporation of Indiana No Drawing. Application May 17, 1954, Serial No. 430,413

9 Claims. (Cl. 167—71)

The present invention relates to a pharmaceutical preparation displaying marked diuretic properties and to a method of preparing the same. It particularly relates to a new and improved, stable aqueous solution of Mersalyl and a method for preparing such solution.

The acid form of Mersalyl, also known as Salyrgan, is chemically identified as ortho (hydroxymercurimethoxypropylcarbamyl) phenoxy acetic acid. The Mersalyl acid has the following structure:

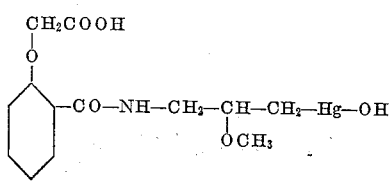

The drug is normally used in the form of its alkali metal salt, or in the acid form. Its most common uses are for edema of heart failure, cardiorenal diseases, nephrosis, ascites of liver disease and chronic nephritis with edema.

While the Mersalyl drugs have been used alone, administration of the drugs by themselves has not been found too desirable inasmuch as some of the salts of Mersalyl, such as sodium Mersalyl, tend to deteriorate and to precipitate mercury, both upon standing and in the human system.

To overcome this objection it has previously been suggested to combine Mersalyl drugs with other diuretic drugs such as theophylline. This combination has been found to produce less reaction on local tissue when administrated by intramuscular or intravenous injection than does Mersalyl alone. The combination of Mersalyl with theophylline is widely used as a diuretic for dropsy in cardiorenal disease and nephrosis, ascites of liver disease and other conditions. The combination of Mersalyl and theophylline apparently permits more rapid absorption of Mersalyl, thus accelerating diuresis. In addition, the deposition of mercury is prevented, thus improving the local tolerance. Theophylline is added to Mersalyl in some instances to prevent the formation of toxic products, for solutions of Mersalyl containing sodium chloride or other salts will often tend to decompose and become toxic unless some substance, such as theophylline, which inhibits decomposition of the mercurial complex, is present.

This prevention of the decomposition of the mercurial complex in Mersalyl by theophylline is not always complete. In spite of the presence of theophylline, Mersalyl will often break down or decompose and deposit out mercury. Such preparations in which deposition of mercury has occurred are unfit for human use because of the high toxicity of metallic mercury.

I have now found that it is possible, by means of a novel stabilizing agent, to produce stable aqueous solutions of Mersalyl and theophylline. These aqueous solutions may be stored indefinitely without the depositing out of mercury.

The novel "stabilizing agent" referred to above which is capable of indefinitely maintaining Mersalyl in a solubilized state, comprises a methylated amino acid.

Further, these new and improved, stabilized aqueous solutions of Mersalyl may be administered intravenously, intramuscularly or subcutaneously, with no adverse effects. With my solutions of Mersalyl there is no pain, or burning sensation to the recipient at the site of the injection such as was present in the vast majority of the Mersalyl compounds employed heretofore. This is especially significant with regard to subcutaneous administration of the drug, for no compound produced heretofore, to my knowledge, could be painlessly administered subcutaneously without admixing the drug with an analgesic or the like.

In accordance with the foregoing, an object of the present invention is to provide stabilized aqueous solutions of Mersalyl which are less toxic than sodium Mersalyl and contain an equivalent amount of Mersalyl.

Another object of the present invention is to provide a mercurial diuretic which can be injected intravenously, intramuscularly or subcutaneously without the appearance of pain or the burning sensation previously associated with the parenteral administration of mercurial diuretics.

Still another object is to provide a stable aqueous solution of Mersalyl which is capable of being stored indefinitely without depositing mercury.

Still a further object is to provide a new and improved stabilizing agent for preparing stable, aqueous, parenteral solutions of Mersalyl.

Another object of the invention is to provide a new and improved method for preparing stable aqueous solutions of Mersalyl.

Other objects and advantages of the instant invention will be apparent to those skilled in the art from the following disclosures and appended claims.

In accordance with the present invention, from about 1 to 3 molecular portions of a methylated amino acid is dissolved in a sufficient amount of water. To this solution is added from about 1 to 2 molecular portions of theophylline, with a sufficient amount of agitation to form a slurry. To this slurry of theophylline and the methylated amino acid is added from about ½ to 1½ molecular portion of Mersalyl, which in turn is slurried. A sufficient amount of a solution of a base is then added to the slurry to dissolve the Mersalyl and the theophylline. A predetermined minimum amount of a preservative is then added to the solution and the solution agitated until it becomes homogeneous. The solution is thereafter carefully adjusted to a pH of numerically from about 7.9 to 8.1, with a pH 8 preferred.

When combined with Mersalyl, methylated amino acids do not combine with the Mersalyl itself to form a salt or the like, but rather are merely present in the aqueous solution and act as highly efficient stabilizing agents.

The amino acids which are used in the instant invention are the methylated glycines. By "methylated glycine" is meant a stabilizing agent consisting essentially of glycine having one or more methyl groups substituted for a corresponding number of hydrogen atoms on the nitrogen atom of the glycine molecule. Three examples of such methylated glycine compounds are:

(a) N-methyl glycine or methyl glycocoll, better known as sarcosine;

(b) N,N-dimethyl glycine or dimethyl glycocoll; and (c) trimethyl glycine or trimethyl glycocoll, more commonly referred to as betaine, betaine hydrate, or oxyneurine.

Of the above listed methylated glycines, betaine or betaine hydrate is preferred, for it is the lowest in price and is commercially available, large amounts of the substance being produced at low cost from sugar beet molasses.

The theophylline employed in the instant invention is of medicinal grade of the standard prescribed in the U. S. Pharmacopoeia.

The base which is employed may comprise substantially any alkali or alkaline earth metal hydroxide, as, for example, sodium hydroxide, potassium hydroxide, ammonium hydroxide, calcium hydroxide (in suspension) or the like. The preferred base, however, is sodium hydroxide.

The amount of base added should be approximately equal, on a molar basis, to the amount of Mersalyl present in the solution. If substantially less than 1 mole of base is added for each mole of Mersalyl, the Mersalyl will not be completely dissolved, while, on the other hand, if substantially more than 1¼ moles of base is added for each mole of Mersalyl, the excess base will cause a breakdown of the Mersalyl in a short period of time. Therefore the amount of base added should not exceed the amount necessary to produce a pH range numerically of from about 7.9 to about 8.1, at which range Mersalyl is completely solubilized and stable.

The preservative employed in producing these stable, aqueous solutions of Mersalyl may consist of substantially any non-toxic bactericidal substance which is compatible with the components of the solution. Examples of preservatives or bactericidal substances which may be employed in this invention are benzyl alcohol and phenol. Other preservatives which are medically accepted for use in parenteral solutions may also be employed. Benzyl alcohol, however, is preferred. The preservatives are present for their bacteriostatic qualities and do not enter into the stabilization of the Mersalyl solutions. Accordingly, if desired, the preservative may be dispensed with in situations wherein the Mersalyl solution is to be used in a short period of time and is not to be stored.

The amount of preservative is not critical and can vary in a range of from about 0.5% to 1.5% by weight of the solution depending on the particular preservative material employed. It will, of course, be appreciated that the amount of preservative used should be within the limits recognized for parenteral preparations.

The water employed in producing the aqueous solution may comprise substantially any non-contaminated water which is fit for parenteral purposes. Preferably, however, in commercial practice, so-called water for injection, that is, distilled and sterile water, is employed in producing the aqueous solutions.

Since Mersalyl is decomposed in the presence of carbon dioxide and is also decomposed by the action of actinic light, the steps of the instant invention preferably are performed in the absence of actinic light and carbon dioxide. This, however, is not absolutely necessary and the Mersalyl solutions may be prepared in the presence of low actinic light and the ambient atmosphere if desired. However, in order to assure consistently good results I prefer to perform all the mixing operations, and the like under an inert atmosphere, such as nitrogen, with the aid of a red (photographic room) light. When the steps are thus carried out in substantial darkness and in a nitrogen atmosphere there is complete assurance that the Mersalyl will not decompose while the aqueous solutions are being prepared.

The ratio of methylated glycine to theophylline which may be employed to produce a stable aqueous solution of Mersalyl lies in a range of from about 1 to 3 moles of methylated glycine to one mole of theophylline. For optimum results, however, a ratio of two moles of methylated glycine to one mole of theophylline is preferred.

The following examples, given by way of illustration only, and not by way of limitation, more clearly illustrate the instant invention.

Example I

The following ingredients were employed:

|  | Amounts | Mols. |
| --- | --- | --- |
| Betaine Hydrate | 68.25 Gm | 0.504 |
| Theophylline U. S. P | 50.00 Gm | 0.252 |
| Mersalyl (acid form) | 95.65 Gm | 0.198 |
| Sodium Hydroxide | 8.64 Gm | 0.216 |
| Benzyl Alcohol | 15.00 cc | |
| Water for Injection | q. s. to 1,000 cc | |

About 400 cc. of water for injection were poured into a 1000 ml. volumetric flask. The betaine hydrate (trimethyl-glycine) was added and the flask was shaken until the betaine hydrate was completely dissolved. The theophylline was then added and the flask again shaken to form a slurry. The Mersalyl acid was thereafter added with agitation and also slurried. 130 cc. of a 1.5 N sodium hydroxide solution was added with agitation. The benzyl alcohol was next added and the solution again shaken vigorously until homogeneous. The Mersalyl acid and theophylline were dissolved during the addition of alkali except for a small amount of insoluble residue which did not appear to be soluble regardless of the amount of alkali which was added. A rough determination of the pH was then taken and was found to lie between about 7.0 and 7.5. The pH was then adjusted accordingly to a pH numerically of about 8.0 by the careful addition of the 1.5 N sodium hydroxide solution. As noted previously, it is important that the pH of the finished solution lie in a range of from about 7.9 to 8.1. The solution was then made up to 1000 ml. with a proper amount of water for injection.

The solution thus obtained was allowed to stand in the dark for 10 days, after which time it was sterile filtered through a porcelain bacteriological filter, and aseptically filled in an atmosphere of nitrogen into vials. The batch was then sampled and tested for sterility and assayed for mercury and theophylline.

The molar ratio of base (NaOH) to Mersalyl employed in the foregoing example is substantially 1.091 to 1. I have found that, in general, a slight excess of the base over the Mersalyl gives optimum results, with 1.091 molar parts of base to one part of Mersalyl being preferred, for this ratio results in a solution having a pH 8.0.

The aqueous solution of Mersalyl acid thus produced was completely stable and showed no signs of decomposition after storage at 40° C. for an extended period of time.

Example II

Four identical groups of ten vials were each filled respectively with one of four different Mersalyl solutions prepared according to the method of the instant invention; each solution containing a different stabilizing agent. The stabilizing agent employed in each group was as follows:

Group A: N-methyl glycine (sarcosine)
Group B: N,N-dimethyl glycine
Group C: Trimethyl glycine (betaine hydrate)
Group D: glycine (not methylated)

The solutions of each group contained about 2 moles of the methylated glycine stabilizing agent, 1 mole of theophylline and about 1 mole of Mersalyl.

All four groups, A–D, were subjected to a tyndallization "break-down" treatment as follows:

All of the vials in each group were initially heated at 100° C. for 30 minutes after which time they were all allowed to cool to room temperature. After all vials had cooled, one vial from each group was set aside and observed for the typical precipitation which results from Mersalyl decomposition. The remaining vials were again heated at 100° for 30 minutes after which time they were again allowed to cool to room temperature. Another vial from each group was set aside for observation and the remaining vials again heated. This procedure was continued until all vials in the group had been heated and set aside for observation; the tenth vial being heated ten times, the ninth nine times, and so on.

The results of this test are clearly shown in the following table, wherein "ppt." denotes a clear precipitation of decomposed Mersalyl, while "no ppt." denotes no breakdown from the treatment:

| Number of Heatings at 100° C. for 30 min. | Group A N-Methyl glycine (sarcosine) | Group B N,N-Dimethyl glycine | Group C Trimethyl glycine (betaine hydrate) | Group D Glycine |
| --- | --- | --- | --- | --- |
| 1 | no ppt | no ppt | no ppt | ppt. |
| 2 | no ppt | no ppt | no ppt | ppt. |
| 3 | no ppt | no ppt | no ppt | ppt. |
| 4 | no ppt | no ppt | no ppt | ppt. |
| 5 | no ppt | no ppt | no ppt | ppt. |
| 6 | no ppt | no ppt | no ppt | ppt. |
| 7 | no ppt | no ppt | no ppt | ppt. |
| 8 | no ppt | no ppt | no ppt | ppt. |
| 9 | no ppt | no ppt | no ppt | ppt. |
| 10 | no ppt | no ppt | no ppt | ppt. |

As is plainly seen in the above table, all the methylated glycine substances tested completely protected Mersalyl from decomposition by the tyndallization treatment, even after ten heatings. The non-methylated glycine, on the other hand, affords no protection or stability even on the first heating. In addition, the decomposition of the glycine containing solution becomes progressively greater on successive heatings.

I have found that if a preparation "breaks" on the first heating it will usually show decomposition within 10 days to 6 weeks at room temperature, while, if incubated at 40° C., it will show Mersalyl decomposition within 5 to 8 days.

If, on the other hand, a solution will stand 3 or 4 heatings I have found that such solutions will remain stable and clear at room temperatures for at least two years.

Thus, it would seem from these results that the stabilizing effect of a substance such as sarcosine is due primarily to the methyl group contained on the nitrogen atom. For, glycine (which is merely non-methylated sarcosine) has no effect in stabilizing aqueous solutions of Mersalyl.

Clinical tests made on the stable aqueous Mersalyl acid solutions of the instant invention containing the above described methylated glycine stabilizing agents show that these compounds in aqueous form are extremely safe and effective as diuretics. They may be administered subcutaneously, intramuscularly and intravenously with no noticeable incidence of local tissue reaction, and there is no burning sensation or subjective pain upon injection regardless of the route of administration.

As noted previously, most mercurial diuretics must be administered intramuscularly or intravenously because they all cause severe reactions when given subcutaneously. Also, mercurial diuretics usually cause some burning sensation even when given intramuscularly. The novel, stable aqueous solutions of Mersalyl acid of the instant invention, however, have no adverse or painful effects regardless of the manner in which they are administered.

It will be apparent to those skilled in the art that I have now provided a new and improved mercurial diuretic preparation and method of making same. It will also be apparent that the novel, stable, aqueous Mersalyl acid preparations of this invention are unique in being painless and non-toxic regardless of the route of administration, which was not the case with mercurial diuretic compounds produced heretofore.

It will, of course, be understood that various details of the instant invention may be varied through a wide range without departing from the principles of this invention, and it is, therefore, not the purpose to limit the patent granted hereon otherwise than necessitated by the scope of the appended claims.

I claim as my invention:

1. A pharmaceutical preparation comprising an aqueous alkaline solution of ortho (hydroxymercurimethoxypropylcarbamyl) phenoxyacetic acid, theophylline and methylated glycine, said solution having a pH of between 7.9 and 8.1.

2. A pharmaceutical preparation comprising an aqueous solution of ortho (hydroxymercurimethoxypropylcarbamyl) phenoxyacetic acid, theophylline and N-methyl glycine, said solution having a pH of between 7.9 and 8.1.

3. A pharmaceutical preparation comprising an aqueous solution of ortho (hydroxymercurimethoxypropylcarbamyl) phenoxyacetic acid, theophylline and N,N-dimethyl glycine, said solution having a pH of between 7.9 and 8.1.

4. A pharmaceutical preparation comprising an aqueous solution of ortho (hydroxymercurimethoxypropylcarbamyl) phenoxyacetic acid, theophylline and trimethyl glycine, said solution having a pH of between 7.9 and 8.1.

5. A pharmaceutical preparation having marked diuretic properties, which comprises an aqueous solution consisting essentially of from about one-half to one and one-half molecular portions of ortho (hydroxymercurimethoxypropylcarbamyl) phenoxyacetic acid, from about one to two molecular portions of theophylline and from about one to three molecular portions of methylated glycine, said solution having a pH of between 7.9 and 8.1.

6. A pharmaceutical preparation which comprises an aqueous solution consisting essentially of about one molecular portion of ortho (hydroxymercurimethoxypropylcarbamyl) phenoxyacetic acid, about one molecular portion of theophylline, about two molecular portions of methylated glycine, about one molecular portion of a base selected from the group consisting of alkali metal and alkaline earth metal hydroxides and from about 0.5% to 1.5% by weight of said solution of a preservative selected from the group consisting of benzyl alcohol and phenol, and said solution having a pH numerically of from about 7.9 to 8.1.

7. A pharmaceutical preparation which comprises an aqueous solution consisting essentially of about one molecular portion of ortho (hydroxymercurimethoxypropylcarbamyl) phenoxyacetic acid, about one molecular portion of theophylline, about two molecular portions of N-methyl glycine, about one molecular portion of a base selected from the group consisting of alkali metal and alkaline earth metal hydroxides and from about 0.5% to 1.5% by weight of said solution of a preservative selected from the group consisting of benzyl alcohol and phenol, and said solution having a pH numerically of from about 7.9 to 8.1.

8. A pharmaceutical preparation which comprises an aqueous solution consisting essentially of about one molecular portion of ortho (hydroxymercurimethoxypropylcarbamyl) phenoxyacetic acid, about one molecular portion of theophylline, about two molecular portions of N,N-dimethyl glycine, about one molecular portion of a base selected from the group consisting of alkali metal and alkaline earth metal hydroxides and from about 0.5% to 1.5% by weight of said solution of a preservative selected from the group consisting of benzyl alcohol and phenol, and said solution having a pH numerically of from about 7.9 to 8.1.

9. A pharmaceutical preparation which comprises an aqueous solution consisting essentially of about one molecular portion of ortho (hydroxymercurimethoxypropyl-carbamyl) phenoxyacetic acid, about one molecular portion of theophylline, about two molecular portions of betaine hydrate, about one molecular portion of a base selected from the group consisting of alkali metal and alkaline earth metal hydroxides and from about 0.5% to 1.5% by weight of said solution of a preservative selected from the group consisting of benzyl alcohol and phenol, and said solution having a pH numerically of from about 7.9 to 8.1.

References Cited in the file of this patent
UNITED STATES PATENTS

| 2,581,397 | Feinstone | Jan. 8, 1952 |
| 2,667,442 | Schlesinger | Jan. 26, 1954 |

OTHER REFERENCES

Theomersyl, Am. J. Pharm., November 1951, p. 356.